United States Patent
Nakamura (10) Patent No.: US 9,847,650 B2
(45) Date of Patent: Dec. 19, 2017

(54) MANAGEMENT SYSTEM, MANAGEMENT METHOD, CONTROL APPARATUS, AND POWER GENERATION APPARATUS

(71) Applicant: KYOCERA CORPORATION, Kyoto (JP)

(72) Inventor: Kazutaka Nakamura, Yokohama (JP)

(73) Assignee: KYOCERA CORPORATION, Kyoto (JP)

( * ) Notice: Subject to any disclaimer, the term of this patent is extended or adjusted under 35 U.S.C. 154(b) by 324 days.

(21) Appl. No.: 14/419,900

(22) PCT Filed: Aug. 5, 2013

(86) PCT No.: PCT/JP2013/071138
§ 371 (c)(1),
(2) Date: Feb. 5, 2015

(87) PCT Pub. No.: WO2014/024840
PCT Pub. Date: Feb. 13, 2014

(65) Prior Publication Data
US 2015/0207328 A1 Jul. 23, 2015

(30) Foreign Application Priority Data
Aug. 6, 2012 (JP) ................................. 2012-174456

(51) Int. Cl.
H01M 8/04 (2016.01)
H01M 8/08 (2016.01)
(Continued)

(52) U.S. Cl.
CPC ........... *H02J 4/00* (2013.01); *H01M 8/04992* (2013.01); *H01M 8/086* (2013.01);
(Continued)

(58) Field of Classification Search
USPC .......................................................... 307/153
See application file for complete search history.

(56) References Cited

U.S. PATENT DOCUMENTS

2002/0192516 A1 12/2002 Tajima
2007/0042245 A1* 2/2007 Nakamura ........ H01M 8/04313
429/430
(Continued)

FOREIGN PATENT DOCUMENTS

JP 2002-269661 A 9/2002
JP 2002-324566 A 11/2002
(Continued)

OTHER PUBLICATIONS

Office Action dated Oct. 4, 2016 issued by Japanese Patent Office corresponding Japanese Patent Application No. 2016-156579.
(Continued)

*Primary Examiner* — Rexford Barnie
*Assistant Examiner* — Xuan Ly
(74) *Attorney, Agent, or Firm* — Procopio Cory Hargreaves and Savitch LLP (57) ABSTRACT

An energy management system having a fuel cell apparatus (150) as a power generator that generates power using fuel, and an EMS (200) that communicates with the fuel cell apparatus (150). The EMS (200) receives messages that indicate a type of the fuel cell apparatus (150), from the fuel cell apparatus (150).

10 Claims, 7 Drawing Sheets (51) Int. Cl.

| | |
|---|---|
| *H01M 8/10* | (2016.01) |
| *H01M 8/12* | (2016.01) |
| *H01M 8/14* | (2006.01) |
| *H02J 4/00* | (2006.01) |
| *H02J 3/38* | (2006.01) |
| *H02J 13/00* | (2006.01) |
| *H01M 8/04992* | (2016.01) |
| *H01M 8/086* | (2016.01) |
| *H01M 8/1018* | (2016.01) |
| *H01M 8/1246* | (2016.01) |
| *H01M 16/00* | (2006.01) |
| *H01M 8/124* | (2016.01) |
| *H01M 8/04828* | (2016.01) |
| *H01M 8/0662* | (2016.01) |

(52) U.S. Cl.
CPC ....... *H01M 8/1018* (2013.01); *H01M 8/1246* (2013.01); *H01M 8/145* (2013.01); *H01M 16/006* (2013.01); *H02J 3/387* (2013.01); *H02J 13/0075* (2013.01); *H01M 8/0494* (2013.01); *H01M 8/0675* (2013.01); *H01M 2008/1095* (2013.01); *H01M 2008/1293* (2013.01); *H01M 2008/147* (2013.01); *H01M 2250/10* (2013.01); *H01M 2250/402* (2013.01); *H01M 2250/405* (2013.01); *Y02B 90/12* (2013.01); *Y02B 90/14* (2013.01); *Y02B 90/16* (2013.01); *Y02E 40/72* (2013.01); *Y02E 60/525* (2013.01); *Y02E 60/7853* (2013.01); *Y02P 90/40* (2015.11); *Y04S 10/12* (2013.01); *Y04S 40/126* (2013.01)

(56) References Cited

U.S. PATENT DOCUMENTS

| | | |
|---|---|---|
| 2008/0294472 A1 | 11/2008 | Yamada |
| 2011/0016147 A1 | 1/2011 | Fornage |
| 2012/0048325 A1 | 3/2012 | Matsuo et al. |
| 2012/0228950 A1 | 9/2012 | Sakai |
| 2013/0134922 A1 | 5/2013 | Takagi |

FOREIGN PATENT DOCUMENTS

| | | |
|---|---|---|
| JP | 2005-026010 A | 1/2005 |
| JP | 2005-236348 A | 9/2005 |
| JP | 2006-215722 A | 8/2006 |
| JP | 2007-123007 A | 5/2007 |
| JP | 2008-042999 A | 2/2008 |
| JP | 2010-128810 A | 6/2010 |
| JP | 2010-250945 A | 11/2010 |
| JP | 2011-243447 A | 12/2011 |
| WO | 2011/122681 A1 | 10/2011 |
| WO | 2012/011440 A1 | 1/2012 |

OTHER PUBLICATIONS

Office Action dated Feb. 2, 2016 issued by the Japan Patent Office in counterpart Japanese application No. 2012-174456.
Office Action dated Feb. 2, 2016 issued by the Japan Patent Office in counterpart Japanese application No. 2015-198065.
International Search Report; PCT/JP2013/071138; dated Oct. 15, 2013.
Written Opinion of the International Searching Authority; PCT/JP2013/071138; dated Oct. 15, 2013.
Extended European Search Report dated Jun. 30, 2016 issued by the European Patent Office for Counterpart European Application No. 13 82 8034.

\* cited by examiner

| SOLID OXIDE FUEL CELL (SOFC) TYPE | MESSAGE TYPE (BBB) | STATUS (0000 TO X000) |

| POLYMER ELECTROLYTE FUEL CELL (PEFC) TYPE | MESSAGE TYPE (BBB) | STATUS (X001 TO Y000) |

| GAS ENGINE TYPE | MESSAGE TYPE (BBB) | STATUS (Y001 TO Z000) |

FIG. 8

| SOLID OXIDE FUEL CELL (SOFC) TYPE | MESSAGE TYPE (BBB) | STATUS (0000 TO X000) |

| POLYMER ELECTROLYTE FUEL CELL (PEFC) TYPE (QQQQ) | MESSAGE TYPE (BBB) | STATUS (0000 TO X000) |

| GAS ENGINE TYPE (RRRR) | MESSAGE TYPE (BBB) | STATUS (0000 TO X000) |

FIG. 9

MANAGEMENT SYSTEM, MANAGEMENT METHOD, CONTROL APPARATUS, AND POWER GENERATION APPARATUS

TECHNICAL FIELD

The present invention relates to a management system having a power generation apparatus which generates power using fuel, and a control apparatus which communicates with the power generation apparatus, as well as a management method, a control apparatus, and a power generation apparatus.

BACKGROUND ART

In recent years, a power management system having a plurality of equipments, and a control apparatus which controls the plurality of equipments has been proposed (for example, Patent Literature 1). The plurality of equipments includes, for example, household electrical appliances such as air conditioners and illumination apparatuses, and distributed power sources such as photovoltaic cells, storage batteries, and fuel cell apparatuses. The control apparatus, for example, is referred to as HEMS (Home Energy Management System), SEMS (Store Energy Management System), BEMS (Building Energy Management System), FEMS (Factory Energy Management System), and CEMS (Cluster/Community Energy Management System).

For popularizing the above-described management system, generalization of the message format between the plurality of equipments and the control apparatus is effective, and such a generalization of the message format is being tested.

CITATION LIST

Patent Literature

Patent Literature 1: Japanese Patent Application Publication No. 2010-128810.

SUMMARY OF INVENTION

The above-described generalization of the message format has only just begun, and various investigations need to be conducted with regard to the message format for appropriately controlling the equipments.

Thus, the present invention has been achieved in order to overcome the above-described problems, and an object thereof is to provide a management system, a management method, a control apparatus, and a power generation apparatus capable of appropriately controlling equipments.

A management system according to a first feature includes: a power generation apparatus which generates power using fuel, and a control apparatus which communicates with the power generation apparatus. The control apparatus receives a message indicating a type of the power generation apparatus.

In the first feature, the power generation apparatus receives a message indicating an existence of a function of transmitting the message indicating the type of the power generation apparatus, before a reception of the message indicating the type of the power generation apparatus.

In the first feature, the type of the power generation apparatus includes information designating either one of a fuel cell and a gas engine-type power generation apparatus.

In the first feature, the type of the power generation apparatus includes information designating any one of a solid oxide fuel cell, a polymer electrolyte fuel cell, a phosphoric acid fuel cell, and a molten carbonate fuel cell.

In the first feature, the control apparatus receives a message indicating a status information of the power generation apparatus, in addition to the message indicating the type of the power generation apparatus.

In the first feature, the message indicating the status information includes information about planned stopping of the power generation apparatus.

In the first feature, the message indicating the status information includes information indicating whether or not a radiating unit of the power generation apparatus is being used.

A management method according to a second feature is a method used in a management system having a power generation apparatus which generates power using fuel, and a control apparatus which communicates with the power generation apparatus. The management method includes: a step of receiving, by the control apparatus, a message indicating a type of the power generation apparatus.

A control apparatus according to a third feature communicates with a power generation apparatus which generates power using fuel. The control apparatus includes: a reception unit which receives a message indicating a type of the power generation apparatus.

A power generation apparatus according to a fourth feature generates power using fuel. The power generation apparatus includes: a transmission unit which transmits a message indicating a type of the power generation apparatus, to a control apparatus which communicates with the power generation apparatus.

According to the present invention, it is possible to provide a management system, a management method, a control apparatus, and a power generation apparatus capable of appropriately controlling equipments.

DESCRIPTION OF EMBODIMENTS

Hereinafter, a management system according to embodiments of the present invention will be described with reference to the drawings. In the following drawings, identical or similar components are denoted by identical or similar reference numerals.

It should be understood that the drawings are schematic only and the ratio of dimensions is not to scale. Therefore, specific dimensions should be determined with reference to the description below. It is needless to mention that different relationships and ratio of dimensions may be included in different drawings.

Outline of the Embodiments

A management system according to embodiments includes: a power generation apparatus which generates power using fuel, and a control apparatus which communicates with the power generation apparatus. The control apparatus receives a message indicating a type of the power generation apparatus.

Here, a solid oxide fuel cell (SOFC), a polymer electrolyte fuel cell (PEFC), a phosphoric acid fuel cell (PAFC), a molten carbonate fuel cell (MCFC) and a gas engine generator can be considered as the type of the power generation apparatus. Since characteristic of these power generation apparatuses are different from each other, it is extremely important for the control apparatus to identify the type of power generation apparatus in order to control equipments appropriately.

In the embodiment, since the control apparatus receives a message indicating the type of the power generation apparatus, the control apparatus can appropriately control the power generation apparatus.

First Embodiment (Energy Management System)

Figure 1:
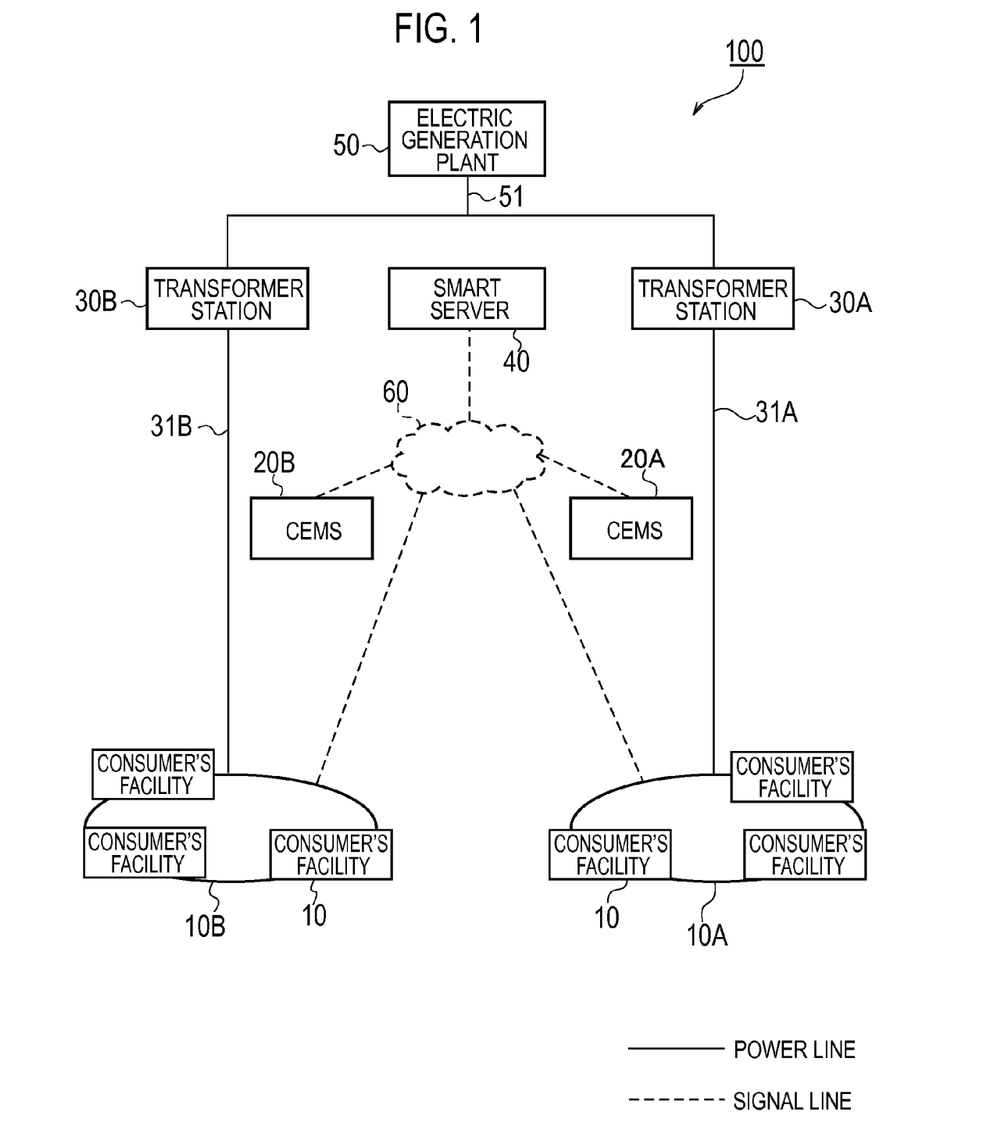
FIG. 1 is a diagram showing an energy management system 100 according to a first embodiment.

The energy management system according to the first embodiment will be described, below. FIG. 1 is a diagram showing an energy management system 100 according to the first embodiment.

As shown in FIG. 1, the energy management system 100 includes a consumer's facility, a CEMS 20, a transformer station 30, a smart server 40, and an electric generation plant 50. It is noted that the consumer's facility, the CEMS 20, the transformer station 30, and the smart server 40 are connected by a network 60.

The consumer's facility has a power generation apparatus and a power storage apparatus, for example. The power generation apparatus is an apparatus which uses fuel gas to output power such as a fuel cell, for example. The power storage apparatus such as a secondary battery is an apparatus in which power is stored.

The consumer's facility may be a detached residence, a housing complex such as an apartment house. Or, the consumer's facility may be a shop such as a corner store or a supermarket. It is noted that the consumer's facility may be a business facility such as an office building or a factory.

In the first embodiment, a consumer's facility group 10A and a consumer's facility group 10B are configured by a plurality of the consumer's facilities 10. The consumer's facility group 10A and consumer's facility group 10B are classified into each geographical region, for example.

The CEMS 20 controls an interconnection between the plurality of consumer's facilities 10 and the power grid. It is noted that the CEMS 20 may be also called a CEMS (Cluster/Community Energy Management System), since the CEMS 20 manages the plurality of consumer's facilities 10. Specifically, the CEMS 20 disconnects the plurality of consumer's facilities 10 and the power grid at a power failure or the like. On the other hand, the CEMS 20 interconnects the plurality of consumer's facilities 10 to the power grid, for example, at restoration of power.

In the first embodiment, a CEMS 20A and a CEMS 20B are provided. The CEMS 20A controls an interconnection between the consumer's facilities 10 included in the consumer's facility group 10A and the power grid, for example. The CEMS 20B controls an interconnection between the consumer's facilities 10 included in the consumer's facility group 10B and the power grid, for example.

The transformer station 30 supplies power to the plurality of consumer's facilities 10 through a distribution line 31. Specifically, the transformer station 30 lowers the voltage supplied from the electric generation plant 50.

In the first embodiment, a transformer station 30A and a transformer station 30B are provided. The transformer station 30A supplies power to the consumer's facilities 10 included in the consumer's facility group 10A through a distribution line 31A, for example. The transformer station 30B supplies power to the consumer's facilities 10 included in the consumer's facility group 10B through a distribution line 31B, for example.

The smart server 40 manages a plurality of the CEMSs 20 (here, the CEMS 20A and CEMS 20B). Further, the smart server 40 manages a plurality of the transformer stations 30 (here, the transformer station 30A and the transformer station 30B). In other words, the smart server 40 integrally manages the consumer's facilities 10 included in the consumer's facility groups 10A and 10B. For example, the smart server 40 has a function of balancing the power to be supplied to the consumer's facility group 10A and the power to be supplied to the consumer's facility group 10B.

The electric generation plant 50 generates power by thermal power, solar power, wind power, water power, atomic power or the like. The electric generation plant 50 supplies power to the plurality of the transformer stations 30 (here, the transformer station 30A and the transformer station 30B) through an electric feeder line 51.

The network 60 is connected to each apparatus via a signal line. The network 60 is an Internet, a wide area network, a narrow area network, and a mobile phone network, for example.

(Consumer's Facility)

Figure 2:
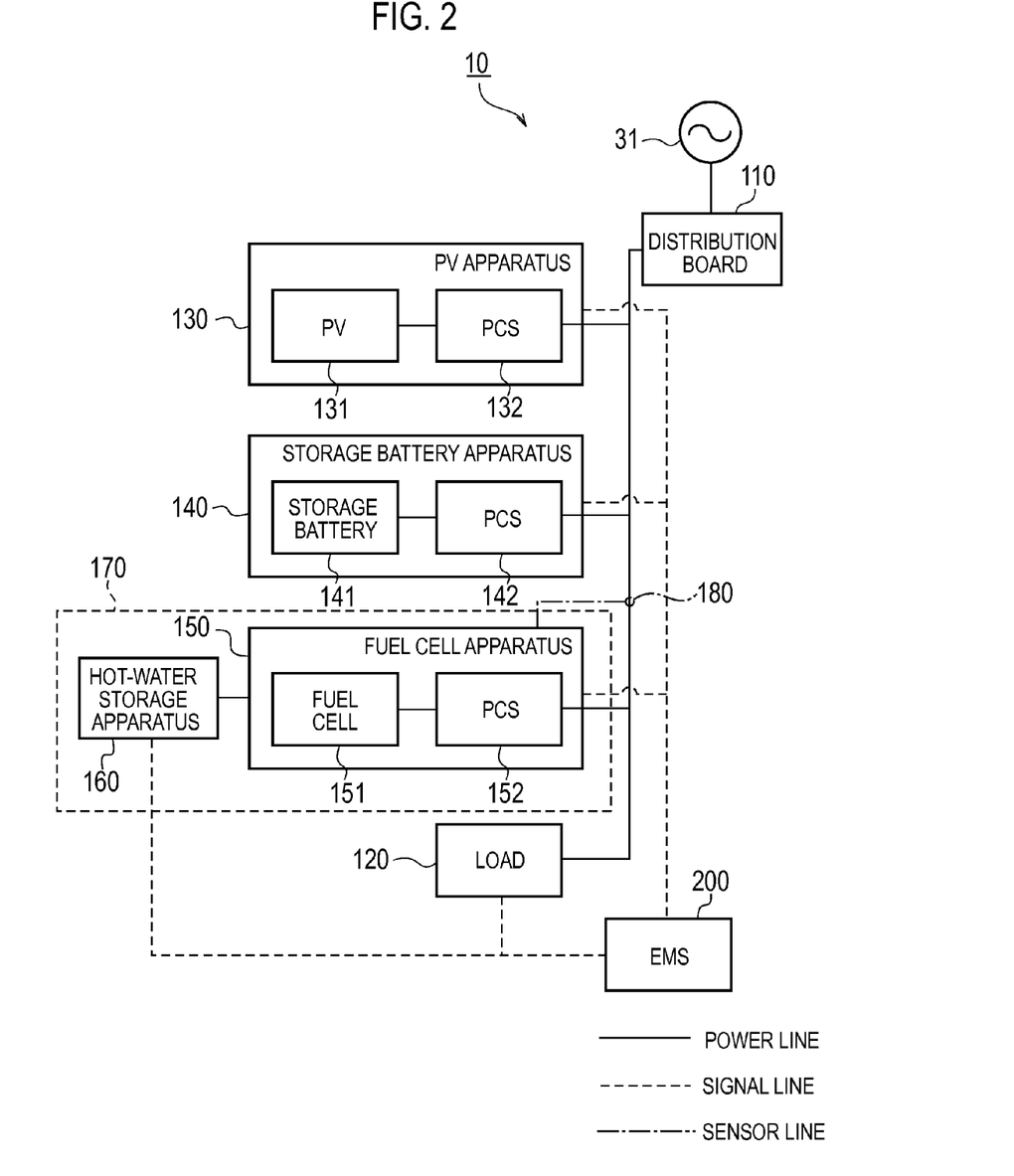
FIG. 2 is a diagram showing a consumer's facility 10 according to the first embodiment.

The consumer's facility according to the first embodiment will be described, below. FIG. 2 is a diagram showing the details of the consumer's facility according to the first embodiment.

As shown in FIG. 2, the consumer's facility includes a distribution board 110, a load 120, a PV apparatus 130, a storage battery apparatus 140, a fuel cell apparatus 150, a hot-water storage apparatus 160, and an EMS 200.

In the first embodiment, the consumer's facility 10 includes an ammeter 180. The ammeter 180 is used for the load following control on the fuel cell apparatus 150. The ammeter 180 is arranged downstream of a connection point between a storage battery apparatus 140 and a power line (the side away from the grid) and upstream of a connection point between the fuel cell apparatus 150 and the power line (the side closer to the grid), on the power line connecting the storage battery apparatus 140 and the fuel cell apparatus 150, and the grid. It is natural that the ammeter 180 is arranged upstream (the side closer to the grid) of the connection point between the load 120 and the power line.

It must be noted that in the first embodiment, each equipment is connected to the power line in the short-distance order to the grid of the PV apparatus 130, the storage battery apparatus 140, the fuel cell apparatus 150, and the load 120. However, the fuel cell apparatus 150 and the storage battery apparatus 140 may be connected in the reverse order as well.

The distribution board 110 is connected to a distribution line 31 (a grid). The distribution board 110 is connected, via a power line, to the load 120, the PV apparatus 130, the storage battery apparatus 140, and the fuel cell apparatus 150.

The load 120 is an apparatus which consumes the power supplied via a power line. Examples of the load 120 include an apparatus such as a refrigerator, a freezer, a lighting, and an air conditioner.

The PV apparatus 130 includes a PV 131 and a PCS 132. The PV 131 is an example of the power generation apparatus, and is a solar light power generation apparatus (Photovoltaic Device) which generates power in response to reception of solar light. The PV 131 outputs the generated DC power. The amount of power generated by the PV 131 varies depending on the amount of solar radiation entering the PV 131. The PCS 132 is an apparatus (Power Conditioning System) which converts the DC power output from the PV 131, into AC power. The PCS 132 outputs the AC power to the distribution board 110 via a power line.

In the first embodiment, the PV apparatus 130 may include a pyranometer which measures the solar radiation entering the PV 131.

The PV apparatus 130 is controlled by an MPPT (Maximum Power Point Tracking) method. In particular, the PV apparatus 130 optimizes an operation point (point determined by an operation-point voltage value and power value, or a point determined by an operation-point voltage value and current value) of the PV 131.

The storage battery apparatus 140 includes a storage battery 141 and a PCS 142. The storage battery 141 is an apparatus which stores power. The PCS 142 is an apparatus (Power Conditioning System) which converts the AC power supplied from the distribution line 31 (grid), into DC power. Further, the PCS 142 converts the DC power output from the storage battery 141, into AC power.

The fuel cell apparatus 150 includes a fuel cell 151 and a PCS 152. The fuel cell 151 is an example of a power generation apparatus, and an apparatus which generates power by using a fuel (gas). The PCS 152 is an apparatus (Power Conditioning System) which converts the DC power output from the fuel cell 151, into AC power.

The fuel cell apparatus 150 is operated by load following control. In particular, the fuel cell apparatus 150 controls the fuel cell 151 so that the power output from the fuel cell 151 reaches a target power of the load following control.

The hot-water storage apparatus 160 is an apparatus which either generates hot water using fuel (gas), or maintains the water temperature. Specifically, the hot-water storage apparatus 160 includes a hot-water storage tank where the water supplied from the hot-water storage tank is warmed by the heat generated by burning of fuel (gas) or the exhaust heat generated by drive (power generation) of the fuel cell 151. In particular, the hot-water storage apparatus 160 warms the water supplied from the hot-water storage tank and feeds the warmed water back to the hot-water storage tank.

It must be noted that in the embodiment, the fuel cell apparatus 150 and the hot-water storage apparatus 160 configure the hot-water supply unit 170 (the hot-water supply system).

The EMS 200 is an apparatus (Energy Management System) which controls the PV apparatus 130, the storage battery apparatus 140, the fuel cell apparatus 150, and the hot-water storage apparatus 160. Specifically, the EMS 200 is connected to the PV apparatus 130, the storage battery apparatus 140, the fuel cell apparatus 150, and the hot-water storage apparatus 160 via a signal line, and controls the PV apparatus 130, the storage battery apparatus 140, the fuel cell apparatus 150, and the hot-water storage apparatus 160. Further, the EMS 200 controls an operation mode of the load 120 to control the power consumption of the load 120.

Further, the EMS 200 is connected, via the network 60, to various types of servers. The various types of servers store information such as a purchase unit price of power supplied from a grid, a sales unit price of the power supplied from the grid, and a purchase unit price of fuel, for example (hereinafter, energy rate information).

Alternatively, various types of servers store information for predicting the power consumption of the load 120 (hereinafter, consumed-energy prediction information), for example. The consumed-energy prediction information may be generated on the basis of an actual value of the power consumption of the load 120 in the past, for example. Alternatively, the consumed-energy prediction information may be a model of the power consumption of the load 120.

Alternatively, various types of servers store information for predicting an amount of power generated by the PV 131 (hereinafter, PV-power-generation-amount prediction information), for example. The PV-power-generation prediction information may be a predicted value of a solar radiation entering the PV 131. Alternatively, the PV-power-generation prediction information may be a weather forecast, a season, and hours of sunlight, for example.

(Fuel Cell Apparatus)

Figure 3:
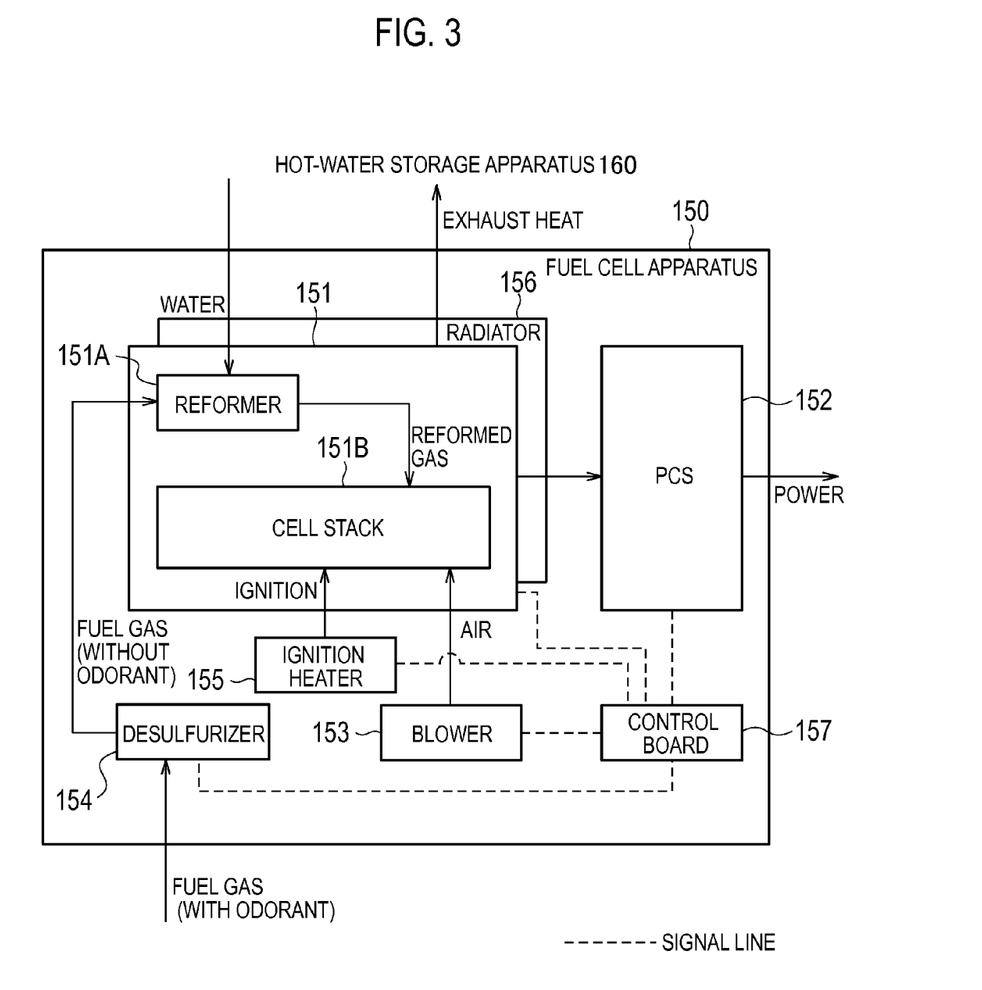
FIG. 3 is a diagram showing a fuel cell apparatus 150 according to the first embodiment.

Hereinafter, the fuel cell apparatus according to the first embodiment will be described. FIG. 3 is a diagram showing a fuel cell apparatus 150 according to the first embodiment.

As shown in FIG. 3, the fuel cell apparatus 150 includes a fuel cell 151, a PCS 152, a blower 153, a desulfurizer 154, an ignition heater 155, a radiator 156, and a control board 157.

The fuel cell 151 is an apparatus which uses fuel gas to output power, as described above. Specifically, the fuel cell 151 includes a reformer 151A and a cell stack 151B.

The reformer 151A generates reformed gas from the fuel gas obtained by removing an odorant by the desulfurizer 154 described later. The reformed gas is comprised of hydrogen and carbon monoxide.

The cell stack 151B generates power upon chemical reaction between air (oxygen) supplied from the blower 153 described later and the reformed gas. Specifically, the cell stack 151B has a structure obtained by stacking a plurality of cells on top of one another. Each cell has a structure in which an electrolyte is sandwiched between a fuel electrode and an air electrode. The fuel electrode is supplied with reformed gas (hydrogen) and the air electrode is supplied with air (oxygen). In the electrolyte, a chemical reaction between reformed gas (hydrogen) and air (oxygen) occurs, and as a result, power (DC power) and heat are generated.

The PCS 152 is an apparatus which converts the DC power output from the fuel cell 151 into AC power, as described above.

The blower 153 supplies the fuel cell 151 (cell stack 151B) with air. The blower 153 is configured by a fan, for example.

The desulfurizer 154 removes the odorant included in fuel supplied from outside. Fuel may be city gas or LP gas.

The ignition heater 155 ignites fuel not chemically reacted in the cell stack 151B (hereinafter, unreacted fuel), and maintains a temperature of the cell stack 151B at high temperature. That is, the ignition heater 155 ignites the unreacted fuel leaked from an opening of each cell configuring the cell stack 151B. It should be noted that the ignition heater 155 may suffice to ignite the unreacted fuel in a case where the unreacted fuel is not burnt (for example, when the fuel cell apparatus 150 is started). Then, once ignited, when the unreacted fuel gradually leaked from the cell stack 151B keeps on burning, the temperature of the cell stack 151B is kept at high temperature.

The radiator 156 configures a radiating unit of the fuel cell apparatus 150. The radiator 156 cools the cell stack 151B so that the temperature of the cell stack 151B does not exceed the upper limit of the acceptable temperature. For example, in a case where the temperature of the cell stack 151B exceeds the upper limit of the acceptable temperature even if the heat of the cell stack 151B is used in the hot-water storage apparatus 160, the radiator 156 cools the cell stack 151B. It must be noted that the state when the radiator 156 is being used is the state when the operating efficiency of the fuel cell apparatus 150 declines since the heat of the cell stack 151B is not being used effectively.

The control board 157 is a board mounted with a circuit which controls the fuel cell 151, the PCS 152, the blower 153, the desulfurizer 154, and the ignition heater 155.

In the first embodiment, the cell stack 151B is an example of a power generation unit which generates power by a chemical reaction. The reformer 151A, the blower 153, the desulfurizer 154, the ignition heater 155, and the control board 157 are an example of auxiliaries which supports the operation of the cell stack 151B. Moreover, a part of the PCS 152 may be handled as the auxiliaries.

In the first embodiment, as an operation mode of the fuel cell apparatus 150, a power generation mode, an idling mode, and a constant temperature mode are provided.

The power generation mode is an operation mode (load following control) in which the power output from the fuel cell 151 (cell stack 151B) is controlled to follow the power consumption of the load 120 connected to the fuel cell apparatus 150. In particular, in the power generation mode, so that the product of a current value detected by the ammeter 180 and power detected by the PCS 152 becomes target received power, the power output from the fuel cell 151 is controlled. Here, it should be noted here that the fuel cell apparatus 150 is arranged downstream of the ammeter 180, and thus, the power consumption of the auxiliaries also is covered by the power output from the fuel cell 151.

Here, the temperature of the cell stack 151B in the power generation mode is maintained at 650 to 1000° C. (for example, about 700° C.) as a power generation temperature, upon chemical reaction and burning of an unreacted fuel. Such a power generation temperature, that is, when reformed gas (hydrogen) and air (oxygen) are obtained, is in a temperature range in which a chemical reaction is promoted.

Incidentally, it is also possible to completely stop the fuel cell apparatus 150. For example, the fuel cell apparatus 150 may be completely stopped when the fuel cell apparatus 150 is not used for a long time. However, when the fuel cell apparatus 150 is completely stopped, the auxiliaries also stops and the temperature of the fuel cell 151 (the cell stack 151B) drops. Therefore, a long time is needed for the temperature of the fuel cell 151 (the cell stack 151B) to rise up to an extent where power can be generated, and the load following characteristic declines. Therefore, in the first embodiment, in order to avoid a complete stoppage, the idling mode and the constant temperature mode are provided in the operation mode of the fuel cell apparatus 150.

The idling mode is an operation mode in which the power consumption of the auxiliaries is covered by the power output from the fuel cell 151 (the cell stack 151B). However, it should be noted that in the idling mode, the power consumption of the load 120 is not covered by the power output from the fuel cell 151.

Here, the temperature of the cell stack 151B in the idling mode is maintained at a power generation temperature (for example, about 700° C.) similar to that in the power generation mode, by a chemical reaction and burning of an unreacted fuel. That is, the temperature of the cell stack 151B in the idling mode is in a temperature range in which a chemical reaction is promoted once reformed gas (hydrogen) and air (oxygen) are obtained, similarly to the power generation mode. The idling mode is an operation mode applied when a power failure occurs, for example.

The constant temperature mode is an operation mode in which the power consumption of the auxiliaries is covered by the power supplied from outside, and the cell stack 151B is kept within a predetermined temperature range. In the constant temperature mode, the power consumption of the auxiliaries may be covered by the power supplied from the grid, and may be covered by the power supplied from the PV 131 or the storage battery 141. In the constant temperature mode, the power output from the fuel cell 151 (the cell stack 151B) is smaller than, at least, the power consumption of the auxiliaries, and as in the idling mode, the power just falls short of the strength allowing the auxiliaries to be operated. For example, in the constant temperature mode, the power is not output from the fuel cell 151 (the cell stack 151B).

Here, the temperature of the cell stack 151B in the constant temperature mode is kept, primarily, by the burning of an unreacted fuel. Further, the temperature of the cell stack 151B in the constant temperature mode is lower than the temperature of the cell stack 151B in the power generation mode. Likewise, the temperature of the cell stack 151B in the constant temperature mode is lower than the temperature of the cell stack 151B in the idling mode. However, as a result of burning of the unreacted fuel, the temperature of the cell stack 151B in the constant temperature mode is kept at a certain level of high temperature (a predetermined temperature range).

In the first embodiment, the predetermined temperature range is slightly lower than the power generation temperature, for example, at about 450° C. to 600° C., and is in a temperature range in which a sufficient chemical reaction is less likely to take place even when the reformed gas (hydrogen) and air (oxygen) are obtained. When the temperature of the cell stack 151B is in a predetermined temperature range, the reaction speed of a chemical reaction is insufficient, and thus, the voltage output from the fuel cell 151 (the cell stack 151B) is lower than rated voltage (for example, 200V). In the constant temperature mode, a chemical reaction may not be caused at all, or a slight chemical reaction may be caused. However, the predetermined temperature range is obviously higher than a normal temperature. Thus, in the constant temperature mode, even when it becomes necessary to generate power, it takes less time to reach a temperature at which the chemical reaction is promoted as compared to a state where complete stoppage occurs, and the time until the required power is output is shortened (the load following characteristic is high).

Furthermore, the amount of fuel gas supplied to the fuel cell apparatus 150 in the constant temperature mode is smaller than the amount of fuel gas supplied to the fuel cell apparatus 150 in the power generation mode.

(Network Configuration)

Figure 4:
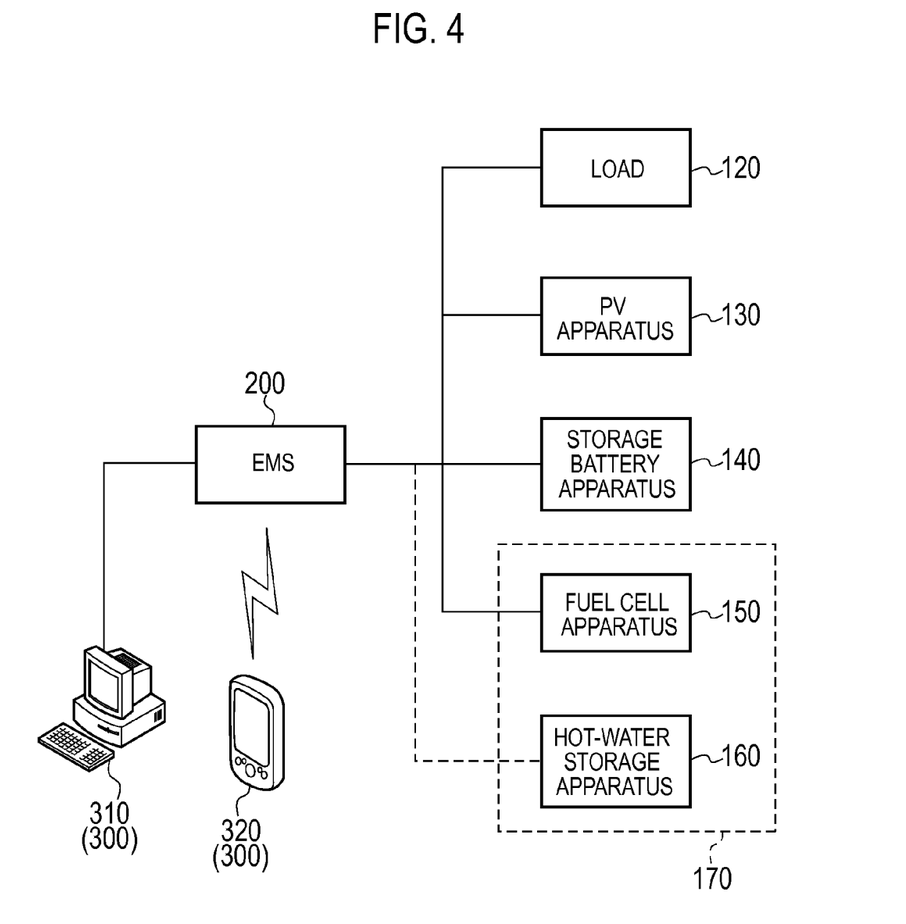
FIG. 4 is a diagram showing a network configuration according to the first embodiment.

Hereinafter, a network configuration according to the first embodiment will be described. FIG. 4 is a diagram showing a network configuration according to the first embodiment.

As shown in FIG. 4, the network is configured by the load 120, the PV apparatus 130, the storage battery apparatus 140, the fuel cell apparatus 150, the hot-water storage apparatus 160, the EMS 200, and the user terminal 300. The user terminal 300 includes a user terminal 310 and a user terminal 320.

The user terminal 310 is connected to the EMS 200, and displays the information for visualization of energy consumption (hereinafter, the visualization information) of each equipment (the load 120, the PV apparatus 130, the storage battery apparatus 140, the fuel cell apparatus 150, and the hot-water storage apparatus 160) through a web browser. In such a case, the EMS 200 generates the visualization information in a format such as HTML, and transmits the generated visualization information to the user terminal 310. The connection type between the user terminal 310 and the EMS 200 may be wired or may be wireless.

The user terminal 320 is connected to the EMS 200, and displays the visualization information through an application. In such a case, the EMS 200 transmits the information showing the energy consumption of each equipment to the user terminal 320. The application of the user terminal 320 generates the visualization information on the basis of the information received from the EMS 200, and displays the generated visualization information. The connection type between the user terminal 320 and the EMS 200 may be wired or may be wireless.

As described above, in the first embodiment, the fuel cell apparatus 150 and the hot-water storage apparatus 160 configure the hot-water supply unit 170. Therefore, the hot-water storage apparatus 160 need not necessarily possess the function of communicating with the EMS 200. In such a case, the fuel cell apparatus 150 substitutes the hot-water storage apparatus 160 and communicates messages concerning the hot-water storage apparatus 160 with the EMS 200.

In the first embodiment, the communication between the EMS 200 and each equipment (the load 120, the PV apparatus 130, the storage battery apparatus 140, the fuel cell apparatus 150, and the hot-water storage apparatus 160) is performed by a method which is in accordance with a predetermined protocol. The predetermined protocol could be, for example, a protocol called the "ECHONET Lite" or the "ECHONET". However, the embodiment is not restricted to these protocols, and the predetermined protocol could also be a protocol other than the "ECHONET Lite" or the "ECHONET" (for example, ZigBee (registered trademark)).

(Configuration of EMS)

Figure 5:
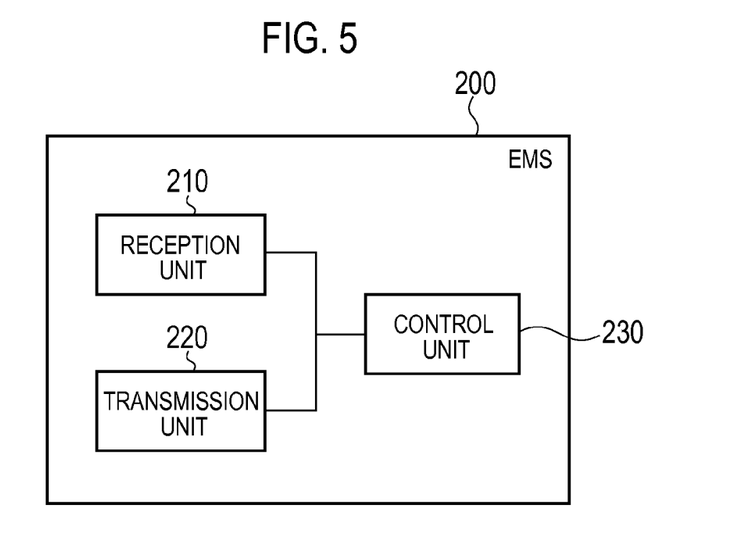
FIG. 5 is a diagram showing an EMS 200 according to the first embodiment.

Hereinafter, an EMS according to the first embodiment will be described. FIG. 5 is a block diagram showing an EMS 200 according to the first embodiment.

As shown in FIG. 5, the EMS 200 has a reception unit 210, a transmission unit 220, and a control unit 230.

The reception unit 210 receives various types of signals from an apparatus connected via a signal line. For example, the reception unit 210 may receive information indicating the amount of power generated by the PV 131, from the PV apparatus 130. The reception unit 210 may receive information indicating the amount of power to be stored in the storage battery 141, from the storage battery apparatus 140. The reception unit 210 may receive information indicating the amount of power generated by the fuel cell 151, from the fuel cell apparatus 150. The reception unit 210 may receive information indicating the amount of hot water to be stored in the hot-water storage apparatus 160, from the hot-water storage apparatus 160.

In the first embodiment, the reception unit 210 may receive energy charge information, energy consumption prediction information, and PV power-generation amount prediction information from the various types of servers via the network 60. However, the energy charge information, the energy consumption prediction information, and the PV power-generation amount prediction information may be stored in advance in the EMS 200.

The transmission unit 220 transmits various types of signals to an apparatus connected via a signal line. For example, the transmission unit 220 transmits a signal for controlling the PV apparatus 130, the storage battery apparatus 140, the fuel cell apparatus 150, and the hot-water storage apparatus 160, to each apparatus. The transmission unit 220 transmits a control signal for controlling the load 120, to the load 120.

The control unit 230 controls the load 120, the PV apparatus 130, the storage battery apparatus 140, the fuel cell apparatus 150, and the hot-water storage apparatus 160.

In the first embodiment, the control unit 230 instructs the operation mode of the fuel cell apparatus 150 to the fuel cell apparatus 150. In the first embodiment, the operation mode of the fuel cell apparatus 150 includes the power generation mode (load following control), the idling mode, and the constant temperature mode, as described above.

When the power output from the fuel cell 151 (the cell stack 151B) exceeds a predetermined threshold value, the control unit 230 performs control to operate the fuel cell apparatus 150 in the power generation mode. On the other hand, for example, when the power output from the fuel cell 151 (the cell stack 151B) falls below a predetermined threshold value, the control unit 230 controls the fuel cell apparatus 150 to operate in the constant temperature mode. Furthermore, the control unit 230 controls the fuel cell apparatus 150 to operate in the idling mode when a power failure occurs, for example.

(Transmitting and Receiving Messages)

In the first embodiment, the EMS 200 (the reception unit 210) receives a message indicating the type of the fuel cell apparatus 150, or a message indicating the status of the fuel cell apparatus 150 when the fuel cell apparatus 150 is operating normally, from the hot-water supply unit 170 (the control board 157 of the fuel cell apparatus 150, in the embodiment). In other words, the control board 157 of the fuel cell apparatus 150 configures a transmission unit which transmits the above-described messages.

Here, the type of the fuel cell apparatus 150 includes information specifying any one of the solid oxide fuel cell (SOFC), the polymer electrolyte fuel cell (PEFC), the phosphoric acid fuel cell (PAFC), and the molten carbonate fuel cell (MCFC).

It must be noted that the status of the fuel cell apparatus 150 indicates the status of the fuel cell apparatus 150 when the normal operation rather than the error when a failure occurs in the fuel cell apparatus 150.

For example, the status of the fuel cell apparatus 150 includes either one of the status that the fuel cell apparatus 150 has stopped and the status that the fuel cell apparatus 150 is generating power. When the type of the fuel cell apparatus 150 is SOFC, PEFC, PAFC, or MCFC, continuous use of the fuel (gas) is more likely to occur in the equipment. Therefore, in order to prevent the continuous consumption of gas over too long a period of time due to some reasons, the fuel cell apparatus 150 may have a configuration which enables forced stopping (hereinafter, planned stopping) after a certain period of time. Planned stopping, by no means, refers to stopping due to an error such as a failure, and even when the fuel cell apparatus 150 restores from an operation stop and resumes an operation, the fuel cell apparatus 150 stops again after some time has passed. For example, from among the different types of fuel cell apparatus 150, particularly in the case of SOFC, it is considered to be preferable to stop the fuel cell apparatus 150 before the timing of reaching the fixed period of time (for example, 27 days) when the gas meter judges a gas leakage. On the other hand, in the case of PEFC, stopping is performed for one hour, once a day, for example. Such a difference in measures results from the fact that the configuration for inducing a chemical change is different even for the same fuel cell, or from the length of the time from stopping state to operating state due to a difference in the reaction temperature of the power generation unit, for example. Thus, such information concerning "operating", "stopped", the stopped period, if the apparatus has stopped, or the scheduled day of stopping the apparatus in future is also included in the status, and the EMS 200 receives a message indicating the status. Thus, as a result of receiving the message indicating the status in this manner by the EMS 200, the EMS 200 identifies the type of the fuel cell apparatus 150, and based on this, can identify conditions such as the period of stopping of the operation for each type, and the periodic cycle of stopping, and thereby judges that an operation stop within these conditions is planned stopping and not a failure. Conversely, if stopping of the fuel cell apparatus 150 does not match the stopping plan for each type of the fuel cell apparatus 150, the EMS 200 may generate warning information indicating the occurrence of some error, and notify the same to the user. In addition, the EMS 200 receives such information on planned stopping for each type of the fuel cell apparatus 150, and by further identifying the stopping plan, sets a higher level of accuracy for the prediction accuracy of the future amount of power generation, and can thus appropriately control the other equipments (such as the load 120).

Moreover, the status of the fuel cell apparatus 150 includes any one of a plurality of stages from the state when the fuel cell apparatus 150 is generating power up to the state when the fuel cell apparatus 150 has stopped. Here, if the type of the fuel cell apparatus 150 is SOFC, approximately one day is needed to reach the state when the fuel cell apparatus 150 has stopped from the state when the fuel cell apparatus 150 is generating power. Therefore, as a result of reception of a message indicating such a status by the EMS 200, the EMS 200 identifies the amount of power generated by the fuel cell apparatus 150, and can thereby appropriately control the other equipments (such as the load 120). Alternatively, the message indicating the status may be the time required until stopping, or the time of stopping.

Else, the status of the fuel cell apparatus 150 includes whether or not the radiator 156 is being used. As described earlier, in the state where the radiator 156 is being used, the entire exhaust heat cannot be recovered by the hot-water storage apparatus 160, and therefore, it can be called the state where heat is being radiated in the air, that is, the state where the operating efficiency of the fuel cell apparatus 150 drops. Therefore, as a result of reception of a message indicating such a status by the EMS 200, the EMS 200 identifies the operating efficiency of the fuel cell apparatus 150, and can thereby appropriately control the other equipments (such as the hot-water storage apparatus 160). For example, the state where a radiating unit such as the radiator 156 is being used is the state where the amount of usage of hot water is less and the amount of the stored hot water in the hot-water storage apparatus 160 has increased, and the use of exhaust heat in the hot-water storage apparatus 160 has declined. Therefore, the EMS 200 may perform control to improve the exhaust heat recovery rate by further increasing the set temperature as compared to the already set hot water temperature in the hot-water storage apparatus 160, or by increasing the set amount of hot water to be stored, for example. Alternatively, since the exhaust heat cannot be used, the EMS 200 may be transferred to the idling mode or the constant temperature mode by calculating the energy usage efficiency and refraining from the aggressive use of the fuel cell apparatus 150 until the amount of the stored hot water in the hot-water storage apparatus 160 declines. In addition, the EMS 200 may perform control so as to reduce the power consumption of the load 120 within the consumer's facility by as much as the amount of decline in the supplied power as a result of such a decline in the output of the fuel cell apparatus 150. That is, depending on the existence of usage of the radiator 156, the EMS 200 can aim for a further improvement in the energy efficiency by changing the settings of the hot-water storage apparatus 160, or changing the operation mode of the fuel cell apparatus, or, further, by controlling the operating status of the other equipments (such as the load 120).

Alternatively, the status of the fuel cell apparatus 150 includes the temperature of the cell stack 151B (the power generation unit). Here, if the type of the fuel cell apparatus 150 is SOFC, the amount of power generated by the fuel cell apparatus 150 varies largely depending on the temperature of the cell stack 151B. Therefore, as a result of reception of a message indicating such a status by the EMS 200, the EMS 200 identifies the amount of power generated by the fuel cell apparatus 150, and can thereby appropriately control the other equipments (such as the load 120). Depending on the temperature of the cell stack 151B, the EMS 200 can also identify the stage between the state when the fuel cell apparatus 150 is generating power and the state when the fuel cell apparatus 150 has stopped.

In the first embodiment, before the reception of a message indicating the type of the fuel cell apparatus 150, the EMS 200 (the reception unit 210) receives a message indicating the existence of a function of transmitting the message indicating the type of the fuel cell apparatus 150, from the hot-water supply unit 170. Alternatively, before the reception of a message indicating the status of the fuel cell apparatus 150 when the fuel cell apparatus 150 is operating normally, the EMS 200 (the reception unit 210) receives a message indicating the existence of a function of transmitting the message indicating the status of the fuel cell apparatus 150 when the fuel cell apparatus 150 is operating normally, from the hot-water supply unit 170. In the present embodiment, a form in which the radiator 156 is installed in the fuel cell apparatus 150 was shown, but the radiator 156 may be arranged in the hot-water storage apparatus 160. In a case where the temperature of the hot water stored in the hot-water storage apparatus 160 exceeds the upper limit of the acceptable temperature, the radiator 156 cools the hot water. In such a case, a message indicating the status of the above-mentioned radiator 156 may be sent to the EMS 200.

In the first embodiment, the EMS 200 (the transmission unit 220) transmits a message indicating the type of the fuel cell apparatus 150, or a message requesting the message indicating the status of the fuel cell apparatus 150 when the fuel cell apparatus 150 is operating normally, to the hot-water supply unit 170 (the control board 157 of the fuel cell apparatus 150, in the embodiment).

In the first embodiment, before the reception of a message indicating the type of the fuel cell apparatus 150, the EMS 200 (the transmission unit 220) transmits a message requesting the message indicating the existence of a function of transmitting the message indicating the type of the fuel cell apparatus 150, to the hot-water supply unit 170. Alternatively, before the reception of a message indicating the status of the fuel cell apparatus 150 when the fuel cell apparatus 150 is operating normally, the EMS 200 (the transmission unit 220) transmits a message requesting the message indicating the existence of a function of transmitting the message indicating the status of the fuel cell apparatus 150 when the fuel cell apparatus 150 is operating normally, to the hot-water supply unit 170.

(Message Format)

Figure 6:
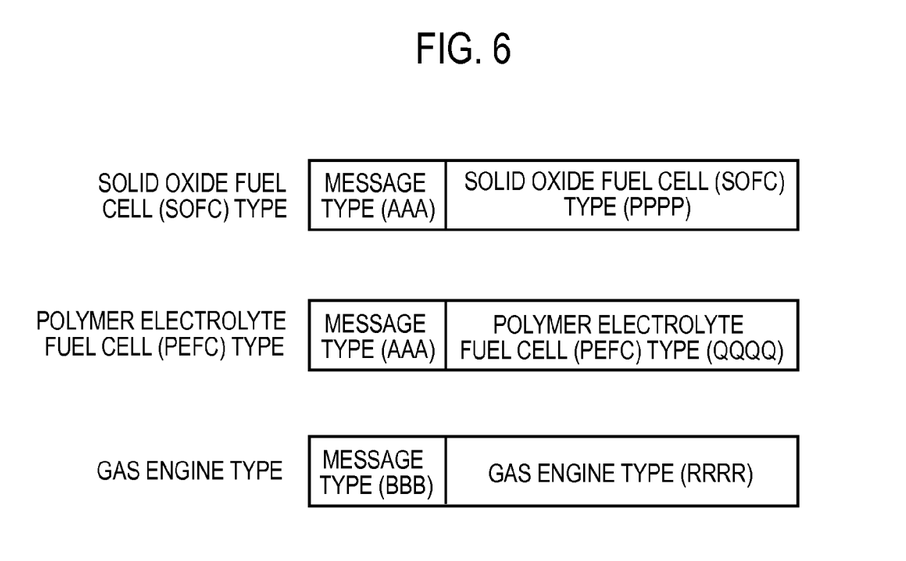
FIG. 6 is a diagram showing a message format according to the first embodiment.
Figure 7:
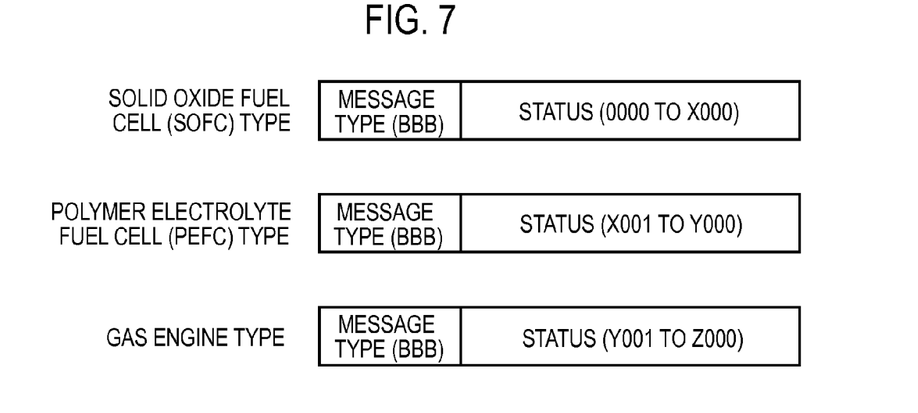
FIG. 7 is a diagram showing a message format according to the first embodiment.
Figure 8:
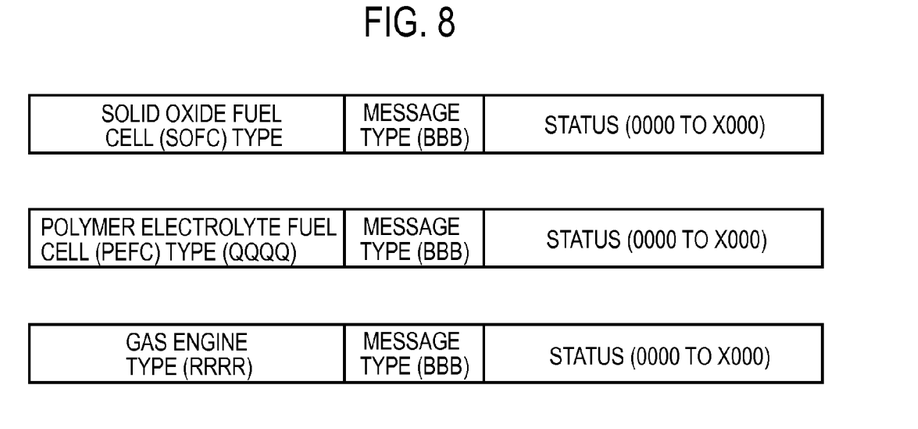
FIG. 8 is a diagram showing a message format according to the first embodiment.

Hereinafter, the message format according to the first embodiment will be described. FIG. 6 through FIG. 8 are diagrams showing an example of a message format according to the first embodiment.

For example, the message indicating the type of the fuel cell apparatus 150 includes the format shown in FIG. 6. As shown in FIG. 6, the message includes a field of the message type and a field of the type of the fuel cell apparatus 150.

The field of the message type indicates the type of the message, and in the first embodiment, it indicates that the message includes the type of the fuel cell apparatus 150. The field of the message type is common for each message.

The field of the type of the fuel cell apparatus 150 indicates the type of the fuel cell apparatus 150. For example, the type of the fuel cell apparatus 150 is the Solid Oxide Fuel Cell (SOFC), the Polymer Electrolyte Fuel Cell (PEFC), or the gas engine.

The message indicating the status of the fuel cell apparatus 150 when the fuel cell apparatus 150 is operating normally includes the format shown in FIG. 7. As shown in FIG. 7, the message includes a field of the message type and a field of the status.

The field of the message type indicates the type of the message, and in the first embodiment, it indicates that the message includes the status of the fuel cell apparatus 150. The field of the message type is common for each message.

The field of the status indicates the status of the fuel cell apparatus 150. In the case shown in FIG. 7, the status of the fuel cell apparatus 150 is displayed using different code spaces for each type of the fuel cell apparatus 150. Therefore, the EMS 200 can designate the type of the fuel cell apparatus 150 by referencing the code space of the field of the status.

Alternatively, the message indicating the status of the fuel cell apparatus 150 when the fuel cell apparatus 150 is operating normally includes the format shown in FIG. 8. As shown in FIG. 8, the message includes a field of the type of the fuel cell apparatus 150, a field of the message type, and a field of the status.

The field of the type of the fuel cell apparatus 150 indicates the type of the fuel cell apparatus 150. For example, the type of the fuel cell apparatus 150 is the Solid Oxide Fuel Cell (SOFC), the Polymer Electrolyte Fuel Cell (PEFC), or the gas engine.

The field of the message type indicates the type of the message, and in the first embodiment, it indicates that the message includes the status of the fuel cell apparatus 150. The field of the message type is common for each message.

The field of the status indicates the status of the fuel cell apparatus 150. The code space of the field of the status is common for each message.

(Management Method)

Figure 9:
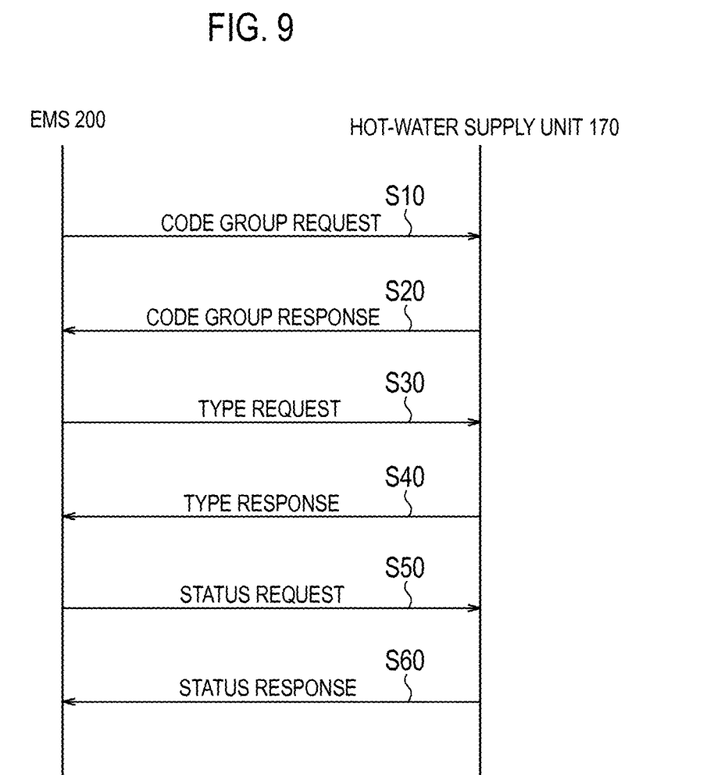
FIG. 9 is a flowchart showing a management method according to the first embodiment.

Hereinafter, the management method according to the first embodiment will be described. FIG. 9 is a sequence diagram showing a management method of the first embodiment.

As shown in FIG. 9, in step S10, the EMS 200 transmits a message (a code group request) requesting a code group supported by the hot-water supply unit 170, to the hot-water supply unit 170. The code group request is an example of a message requesting the message indicating the existence of a function of transmitting the message indicating the type of the fuel cell apparatus 150. Alternatively, the code group request is an example of a message requesting the message indicating the existence of a function of transmitting the message indicating the status of the fuel cell apparatus 150 and the hot-water storage apparatus 160 when the fuel cell apparatus 150 and the hot-water storage apparatus 160 are operating normally.

In step S20, the hot-water supply unit 170 transmits a message (a code group response) indicating the code group supported by the hot-water supply unit 170, to the EMS 200. The code group response is an example of a message indicating the existence of a function of transmitting the message indicating the type of the fuel cell apparatus 150. Alternatively, the code group response is an example of a message indicating the existence of a function of transmitting the message indicating the status of the fuel cell apparatus 150 and the hot-water storage apparatus 160 when the fuel cell apparatus 150 and the hot-water storage apparatus 160 are operating normally.

In step S30, the EMS 200 transmits a message (a type request) requesting the type of the fuel cell apparatus 150, to the hot-water supply unit 170.

In step S40, the hot-water supply unit 170 transmits a message (type response) indicating the type of the fuel cell apparatus 150, to the EMS 200.

In step S50, the EMS 200 transmits a message (a status request) requesting a status of the hot-water supply unit 170 when the hot-water supply unit 170 is operating normally, to the hot-water supply unit 170.

In step S60, the fuel cell apparatus 150 transmits a message (a status response) indicating the status of the hot-water supply unit 170 when the hot-water supply unit 170 is operating normally, to the EMS 200.

As described above, in the first embodiment, the EMS 200 receives the message indicating the type of the power generation apparatus (the fuel cell apparatus 150), which enables it to appropriately control the power generation apparatus (the fuel cell apparatus 150).

In the first embodiment, the EMS 200 receives a message indicating the status of the hot-water supply unit 170 when the normal operation, rather than the error when a failure occurs in the hot-water supply unit 170. This enables the EMS 200 to identify the amount of power generated by the power generation apparatus (the fuel cell apparatus 150), for example, and the EMS 200 can appropriately control the other equipments (such as a load and hot-water storage apparatus).

Other Embodiments

Although the present invention has been described with reference to the embodiment described above, it should not be understood that the discussion and drawings constituting a part of the disclosure are limiting the present invention.

Various alternative embodiments, examples and operation technology will be apparent to a person skilled in the art from the present disclosure.

For example, it is mentioned above that the fuel cell apparatus 150 is operated in the idling mode during the grid power failure; however, if there is a power demand in a load, it may be possible to operate in a self-sustained operation mode in which the power which matches the demand is output. In the self-sustained operation mode, the fuel cell apparatus 150 not only supplies power to the auxiliaries by the fuel cell 151 itself, but also increases the output of the fuel cell 151 so that an output power matching the demand in the load connected to the fuel cell apparatus 150 is obtained. That is, the self-sustained operation mode and the idling mode differ in terms of whether or not to output the generated power externally; however, these modes are uniform in terms of the fact that during a grid power failure, the power supply to the auxiliaries is covered by self power generation. Therefore, for the sake of convenience, the two modes in which the power supply to the auxiliaries during a grid power failure is covered by self power generation may be called autonomous supply modes.

Further, it is mentioned above that in the constant temperature mode, the power consumption of the auxiliaries is covered by the power supply from the grid; however, it may be covered by the output from the PV apparatus 130 or the storage battery apparatus 140.

The EMS 200 may be HEMS (Home Energy Management System), may be SEMS (Store Energy Management System), may be BEMS (Building Energy Management System), and may be FEMS (Factory Energy Management System).

In the embodiment, the consumer's facility 10 includes the load 120, the PV apparatus 130, the storage battery apparatus 140, the fuel cell apparatus 150, and the hot-water storage apparatus 160. However, it may suffice that the consumer's facility 10 includes at least the fuel cell apparatus 150 and the hot-water storage apparatus 160.

In the embodiment, the message indicating the status of the fuel cell apparatus 150 includes the status of the fuel cell apparatus 150 when the normal operation, but can also include the status indicating the error when a failure occurs in the fuel cell apparatus 150.

Although not particularly mentioned in the embodiment, it is preferable to perform transmission and reception of the code group request and the code group response at the timing of performing the initial settings of the fuel cell apparatus 150, the timing of restoration from a power failure, the timing of turning ON the power supply of the fuel cell apparatus 150, the timing of turning ON the power supply of the EMS 200, and the timing when it becomes necessary to check the settings of the fuel cell apparatus 150.

As described above, needless to say, the present invention includes various embodiments and the like not described here. Moreover, it is also possible to combine the above-described embodiments and modifications. Therefore, the technical range of the present invention is to be defined only by the inventive specific matter according to the adequate claims from the above description.

It is noted that the entire content of Japan Patent Application No. 2012-174456 (filed on Aug. 6, 2012) is incorporated in the present application by reference.

INDUSTRIAL APPLICABILITY

According to the present invention, it is possible to provide a management system, a management method, a control apparatus, and a power generation apparatus capable of appropriately controlling equipments.

The invention claimed is:

1. A management system comprising a plurality of apparatuses arranged in a network:
   a power generation apparatus which generates power using fuel; and
   a control apparatus which communicates with the power generation apparatus over the network, wherein the control apparatus
      receives a first message from the power generation apparatus, via the network, wherein the first message indicates that the power generation apparatus is capable of transmitting a type or status of the power generation apparatus,
      after receiving the first message, transmits a second message to the power generation apparatus, via the network, wherein the second message requests the power generation apparatus to indicate the type or status of the power generation apparatus, and,
      after transmitting the second message, receives a third message from the power generation apparatus, via the network, wherein the third message indicates the type or status of the power generation apparatus.

2. The management system according to claim 1, wherein the type of the power generation apparatus includes information designating either one of a fuel cell and a gas engine-type power generation apparatus.

3. The management system according to claim 1, wherein the type of the power generation apparatus includes information designating any one of a solid oxide fuel cell, a polymer electrolyte fuel cell, a phosphoric acid fuel cell, and a molten carbonate fuel cell.

4. The management system according to claim 1, wherein the third message indicates the status of the power generation apparatus.

5. The management system according to claim 4, wherein the status of the power generation apparatus comprises information about a planned stoppage of the power generation apparatus within a normal operation of the power generation apparatus.

6. The management system according to claim 4, wherein the status of the power generation apparatus comprises an indication of whether or not a radiating unit of the power generation apparatus is being used.

7. A management method used in a management system having a power generation apparatus which generates power using fuel, and a control apparatus which communicates with the power generation apparatus over a network, the method comprising, by the control apparatus:
   receiving a first message from the power generation apparatus, via the network, wherein the first message indicates that the power generation apparatus is capable of transmitting a type or status of the power generation apparatus,
   after receiving the first message, transmitting a second message to the power generation apparatus, via the network, wherein the second message requests the power generation apparatus to indicate the type or status of the power generation apparatus, and,
   after transmitting the second message, receiving a third message from the power generation apparatus, via the network, wherein the third message indicates the type or status of the power generation apparatus.

8. A control apparatus which communicates over a network with a power generation apparatus which generates power using fuel, the control apparatus comprising:

a controller which receives a first message from the power generation apparatus, via the network, wherein the first message indicates that the power generation apparatus is capable of transmitting a type or status of the power generation apparatus, after receiving the first message, transmits a second message to the power generation apparatus, via the network, wherein the second message requests the power generation apparatus to indicate the type or status of the power generation apparatus, and, after transmitting the second message, receives a third message from the power generation apparatus, via the network, wherein the third message indicates the type or status of the power generation apparatus.

9. A power generation apparatus which generates power using fuel, the power generation apparatus comprising:

a controller which transmits a first message to the control apparatus, via the network, wherein the first message indicates that the power generation apparatus is capable of transmitting a type or status of the power generation apparatus, after transmitting the first message, receives a second message from the control apparatus, via the network, wherein the second message requests the power generation apparatus to indicate the type or status of the power generation apparatus, and, in response to receiving the second message, transmits a third message to the control apparatus, via the network, wherein the third message indicates the type or status of the power generation apparatus.

10. The management system according to claim 5, wherein the information about a planned stoppage indicates a time period during which the planned stoppage will occur.

* * * * *